United States Patent [19]
Leger

[11] 3,830,094
[45] Aug. 20, 1974

[54] METHOD AND DEVICE FOR DETECTION OF SURFACE DISCONTINUITIES OR DEFECTS

[75] Inventor: Lubert J. Leger, Friendswood, Tex.

[73] Assignee: The United States of America as represented by the Administrator of the National Aeronautics and Space Administration, Washington, D.C.

[22] Filed: Jan. 24, 1973

[21] Appl. No.: 326,326

[52] U.S. Cl. .................. 73/15.4, 73/40.7, 73/104, 23/230 L
[51] Int. Cl. .......................................... G01n 19/08
[58] Field of Search.......... 73/15 R, 15.4, 104, 40.7; 23/230 L, 253 TP

[56] References Cited
UNITED STATES PATENTS

| | | | |
|---|---|---|---|
| 2,667,070 | 1/1954 | Sockman et al. | 73/104 |
| 3,408,270 | 10/1968 | Gentile | 73/104 X |
| 3,555,884 | 1/1971 | Yamamoto et al. | 73/40.7 |

Primary Examiner—Richard C. Queisser
Assistant Examiner—John P. Beauchamp
Attorney, Agent, or Firm—Russell E. Schlorff; Marvin F. Matthews; John R. Manning

[57] ABSTRACT

Surface discontinuities or defects such as cracks and orifices are detected by applying a penetrating fluid, preferably a liquid, to a test surface so as to cause the liquid to penetrate any minute cracks or opening in the surface, removing the excess liquid from the surface, and leaving a residual in the discontinuities, cavities, or in the subsurface materials. A sheet of porous material impregnated with a sensitizing medium which will react with vapors of the residual liquid to form a visible pattern is applied to the test surface. The residual liquid trapped in the discontinuities, cavities, or subsurface material is vaporized, and, as the vapors contact the sensitizing medium on the sheet, a pattern corresponding to the discontinuity is formed on the sheet material and the penetrant completely removed from the sample.

16 Claims, 2 Drawing Figures

PATENTED AUG 20 1974 3,830,094

METHOD AND DEVICE FOR DETECTION OF SURFACE DISCONTINUITIES OR DEFECTS

ORIGIN OF THE INVENTION

The invention described was made by an employee of the U.S. Government and may be manufactured and used by or for the Government of the United States of America for governmental purposes without the payment of any royalties thereon or thereafter.

BACKGROUND OF THE INVENTION

The present invention relates to a method and device for detecting discontinuities or defects in surfaces. More particularly, the invention provides a method for pinpointing defects in supposedly continuous surfaces which are not visible or otherwise detectable. Similarly, the method provides a means of detecting minute leaks.

Surface defects can be detected in several ways, for example, fluoroscopy and liquid penetration. The present method may be considered a related form of liquid penetration, in that a liquid or gaseous vehicle is a central feature of the detection system.

Liquid penetration has been employed in the prior art to detect both surface discontinuities, which are defects in a surface of a material not necessarily extending through the material, and defects which result in minute passages through the material. In many applications, the mere presence of a surface defect without regard to the degree of penetration through the material is the factor of relevant concern, as will be described below.

In the past the use of dyes or pigments has been a particularly important method of detecting surface defects. For example, in the case of surface irregularities not involving full penetration of a material, a liquid has been applied to the surface of the material and the excess removed. The detection method then consisted of observing the seepage of the liquid from the surface to indicate the location of the discontinuities. Generally a dye or pigment is present in the liquid to facilitate the observation. Modifications on this basic approach have employed the use of a dry or wet developer applied over the surface of the material to draw the residual penetrant to the surface and to spread it slightly to make the defects discernible. Another modification is the use of penetrants which fluoresce under ultraviolet or infrared light.

A slight modification of the developer method is the application of the developer such as a dye to a web material. The web material is then contacted with the surface where the penetrant, which has been selected because it is a solvent for the dye, will leach out the dye and deposit it on the web.

A serious drawback to these methods has been the residual penetrant and/or dye or pigments left in the surface irregularities. The liquid penetrants generally employed have had low vapor pressures, i.e., the penetrants were employed as liquids since the visibility of the penetrant or its solvent properties was essential to the prior art methods.

The retention of residual impurities is of paramount interest in that adulterants within the tested material may cause as much of a problem as the defects. Sometimes it may be possible to remove the solvent by heating the material or lowering the pressure on the material; however, any material dissolved in the solvent will still remain in the surface defect or irregularity.

The residual effect is amplified where the material under consideration is porous and sensitive to contamination. However, the outer surface or surfaces thereof are intended to be non-porous and substantially impervious to liquids and gases. A particular application wherein this situation exists is materials employed in spacecraft where weight is a critical consideration. Thus, low density materials are frequently employed. The low density is frequently achieved by use of porous materials, yet these materials cannot be absorptive. For example, a reuseable surface insulation has been developed for use on the Space Shuttle being developed by NASA. The material developed consists of a low density fibrous insulator and a ceramic water-impervious coating. It is important to have an impervious layer since an uncoated insulator sorbs large amounts of water if exposed to high moisture environments which would result in large increases in Shuttle overall weight. Thus, cracks or discontinuities in the surface coating must be detected and repaired. Similarly, joints made in the material must be perfect.

Because of outgassing in space, very high standards are necessarily observed in regard to all materials employed in spacecraft construction. The introduction of foreign residual material, whose effect on the reuseable surface insulation would be an additional undesirable factor in space, is to be avoided. The prior methods have not proved satisfactory in that there may normally be a residual material left in the porous inner core, nor are the prior methods as simple as would be desirable in order to reduce the incursion of error in the very critical surface discontinuity determinations.

SUMMARY OF THE INVENTION

Briefly stated, the present invention is a method for detecting discontinuities in materials whereby the material is contacted with a fluid which goes into the discontinuities, if any, and is passed out of the discontinuities as a vapor. The vapor is contacted with a porous sheet material having a substance impregnated thereon which when contacted with the vapors will produce a discernible indicia on the sheet material. The term "discontinuity" is used herein to include discontinuities which may totally pass through the material to form leaks or which may totally pass into the material without passing completely through it.

The penetrating fluid can be either a gas or liquid. The gas is applied under pressure and will penetrate as a gas, that is, it is not essential to liquefy the gas to employ it in the present invention.

In one embodiment, the present invention is a method for detecting surface discontinuities in non-porous surfaces comprising applying a liquid to the surface, removing excess liquid from the surface, leaving a residual of said liquid in any surface discontinuities or in a porous subsurface material, placing adjacent to the surface a sheet material having impregnated therein a substance which, when contacted with said liquid in vaporous form, will produce a discernible indicia on said sheet material, and vaporizing said liquid. The present invention contemplates a sheet of porous material impregnated with a sensitizing medium which will interact with vapor escaping from a fluid penetrant sorbed in the matrix of a coated surface, by way of a discontinuity in such surface, to form a detectable pattern on said sheet corresponding to said discontinuity.

The present method operates on the volatilization of the fluid which has penetrated into the discontinuities in the surface or the subsurface material, and contacting the vapors as they proceed out of the minute cracks and fissures of the surface with a sheet material which is impregnated with an indicator or developer for the particular liquid employed.

The sheet material can be any material onto which the indicator or developer can be impregnated. Thus, there will usually be a certain degree of absorptiveness displayed in the material. This property is normally present in paper products which are a preferred sheet material to be employed. The term "paper" is intended to mean the conventional vegetable fiber product and the recently developed polymeric materials which possess the attributes of conventional paper as essential to the present method.

A useful property of the sheet material is its permeability to the vaporized liquid. As the vapor passes through the impregnated sheet material, the vapors react with, coordinate with, complex with, develop, or otherwise cause a change in the substance impregnated on the sheet material, and will form a discernible pattern on the sheet material corresponding to the configuration of the discontinuity. The sheet material can be any woven or non-woven material which will function as indicated hereinabove, including paper, cloth, asbestos and the like.

The term "discernible" here is used not only in reference to visibility in ordinary light with the naked eye, but to visibility under UV or infrared light or with subsequent chemical treatment of the reacted sheet material to make the indicia visible.

The sheet material, which can be described as porous and absorptive, provides a further benefit in that the indications of the minute discontinuities, which are invisible to visual examination, are greatly emphasized by the diverging vapor stream as the vapors contact the indicator substance. In other words, there is a vivid enhancement of the line indicating the fissure. However, the location and shape of the line are unchanged. The magnitude of this particular aspect of the operation of the present invention may vary depending on the specific nature of the sheet material.

The color of the sheet material is unimportant except to the extent that the color may interfere with the indicia to be developed. Conveniently white or a neutral color can be employed or a contrasting color to the indicia as developed can be selected.

The impregnated sheet material may be prepared by wetting the sheet material with a solution of the indicator. In most applications, the impregnated sheet is used in a damp or moistened form whereas in other applications the sheet materials are dried and employed in that form, or are dried and moistened prior to use. The moistened sheet material has an advantage in that it is easily shaped to the surface, and a slight adhesive effect is achieved between the surface and the sheet. The enlarging effect for the configuration of the discontinuity by the sheet material noted above is also somewhat enhanced by the moistened sheet material. A principal consideration in regard to the use of moistened sheet material should be the removal of any excess moisture from the sheet so as not to cause any contamination of the surface discontinuities being detected. This is a particularly important consideration where there is a sorptive material adjacent to the discontinuity.

The fluid which is applied to the surface and which is subsequently vaporized from the surface discontinuities or subsurface material can be, in the broadest aspects of the invention, any fluid material which can be vaporized under a given set of conditions and which will leave no residue whose vapors can be contacted with the impregnated sheet material to produce a detectable indicia by interaction with the impregnate of the sheet material. The fluid materials of choice, however, are organic compounds, preferably liquids, which are preferably a single substantially pure material but which may be mixtures such as constant boiling azeotropes.

An important aspect of the present invention is its utilization with materials having a solid, supposedly impervious surface, and a sorptive underlayer, such as previously described in regard to the Space Shuttle.

Outstanding among the advantages of the present method of discontinuity detection over the prior art is the inherent feature of complete removal of the detecting fluid at the same time as the discontinuities are being detected and located. A further advantage is that no material is incorporated into the testing fluid which will remain behind in the tested material as an adulterant. Furthermore, the feature of the present invention employing a separate sheet containing a detecting or sensitizing medium makes the application of the detecting medium on the test surface and the removal of the detecting medium after the test exceedingly simple. A particular advantage of the present invention is the ready availability of the penetrating fluids, liquid and gaseous, and the detection materials impregnated into the sheet material. These and other advantages of the invention will be further apparent from the following discussion.

DESCRIPTION OF THE PREFERRED EMBODIMENT

Figure 1:
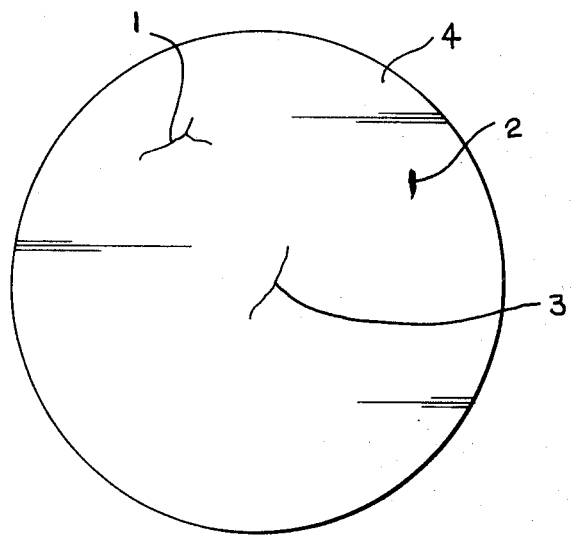
FIG. 1 is a view of a filter paper impregnated with a detecting medium which has been exposed to a test surface containing defects.

In a particular embodiment, the organic liquid material is one which will have a vapor pressure of greater than 100 mm of Hg at room temperature (20° to 30° C.). Under these conditions the method is carried out in its simplest form, in that no special equipment or treatment is necessary to vaporize the organic liquid material.

For example, a number of suitably volatile organic compounds having vapor pressures of 100 mm of Hg or greater at room temperature are shown in Handbook of Chemistry and Physics, 45th Ed., The Chemical Rubber Co., Cleveland, Ohio, 1964, page D103–119. Some specific examples of some suitable test materials are acetaldehyde, trichlorofluoromethane, methanol, methyl iodide, nitromethane, acetone, carbon disulfide, acrylonitrile, diethyl ether, ethylamine, methyl acetate, 2-bromo-1-butene and the like.

In another view of the present invention, however, the organic liquid material is one which will be vaporized, that is, have a vapor pressure of greater than 100 mm of Hg at a given temperature, preferably temperatures in the range of 20° to 100°C. The selection of the temperature is not critical but is based on the properties and characteristics of the test material and on consideration of the simplicity and ease of operation of the present method invention.

Suitable liquid organic materials in additon to those given above for use at temperatures of up to 100° C. would include ethanol, carbon tetrachloride, dichloroethane, propanol, diethyl ether, diethyl sulfide, pentane and the like. The use of liquid organic materials having boiling points below 20° C. is within the scope of the invention. However, it can be appreciated that the use of such materials as liquids, if desired, would require refrigerated or reduced temperature environments in the initial step of applying the liquid material to the test surface. Otherwise, the vaporization might be completed before the sheet material could be applied over the surface. Gaseous penetrants are particularly useful for detecting leaks, wherein the penetrant gas is applied to an inner surface and passes through any cracks or fissures as such. Thus, a gaseous fluid is preferred to a liquid one in this embodiment of the invention since the need to vaporize is avoided.

All liquids will have some vapor pressure; however, if the vapor pressure is too low, e.g., less than 100 mm of Hg at the temperature of the testing, then the vaporization could require an inordinate length of time. Generally the liquid penetrants employed in this invention will be entirely vaporized in from 5 minutes to 6 hours and more preferably within about 60 minutes after application of the liquid to a test surface.

In a further aspect of the present invention, a reduced pressure environment, for example, down to 1 mm of Hg, can be used to vaporize the organic liquid material applied to the test surface.

The reduced pressure environment can be achieved by any of the conventional means currently employed and forms no part of the present invention. The use of a reduced pressure environment considerably broadens the range of liquid organic materials which can be employed. In this embodiment of the present method, the organic liquid is applied to the test surface under ambient room conditions of the operating or testing facility, e.g., 25° C. and 760 mm Hg. The test material is then placed in a suitable vessel such as a stainless steel pressure vessel and the pressure reduced while the temperature is allowed to stay at ambient room temperature. Thus, by this means the rate of removal can be increased for some of the low vapor pressure liquids noted above. An alternate manner of operation in this embodiment is the combination of increased temperature and reduced pressure. The particular conditions for vaporizing a specific liquid organic material can be readily determined by those in the art from such standard reference tables as those noted hereinabove.

The use of a closed system may be desirable, notwithstanding whether variable pressures and temperatures are contemplated, since a closed system will allow recovery of the penetrant, which can improve the economics and ecology of the method.

A prime consideration in selecting the liquid organic material or compound is its non-reactivity with the test material to which it is applied. A further consideration is the nature of the test material and the conditions under which it may safely be handled.

The detection of the vaporized liquid orgainc material is achieved by an interaction between the vaporized material and the impregnate in the sheet material. Thus, a criteria in selecting the liquid organic material is that the vaporized material react with or develop the impregnate. The impregnate can be a single material or mixtures or materials and may contain either organic or inorganic compositions or mixtures thereof. The impregnate need not be an indicator of the vaporized material per se, but an indicator for a functional or reactive substituent of the vaporized organic compound or class of compounds. For example, primary and secondary nitrocompounds react with nitrous acid to give blue nitroso derivatives, thus 1-nitropropane and 2-nitropropane when vaporized would both give a blue indicia on nitrous acid impregnated filter paper.

Since there are essentially color indicator tests for every class of organic compounds and for the various functional groups, the determination of a suitable impregnate for detecting a specific vapor is within the skill of those in the art.

For example, some particularly suitable classes of compounds operable in the invention are aldehydes such as formaldehyde, acetaldehyde, propionaldehyde, butyraldehyde; esters such as methyl methanoate, ethyl ethanoate, ethyl butonoate and the like; ethers such as ethyl ether, isopropyl ether, ethyl methyl ethyl ether and the like; alcohols such as methanol, ethanol, butanol and the like; ketones such as acetone, propanone, and the like. Other particularly useful classes of compounds are halogen-containing compounds, such as the halogenated derivatives of the aforementioned compounds and the alkyl halides such as methyl chloride, butyl chloride, isoamyl chloride and the like. It should be recognized that some of the compounds listed above, as well as other suitable compounds, will function in some embodiments. For example, formaldehyde would have to be employed under pressure or at extremely low temperatures in order to be applied to a test surface as a liquid, or could be employed as a leak detectant in its usual gaseous form. In a like manner, for example, 1-nitropropane might have to be vaporized by reduced pressure, high temperature or a combination thereof to improve the rate of removal from a test surface.

Known spot tests for organic compounds and components are particularly well suited for application to the present invention. The spot tests are usually very sensitive and quickly develop a color upon contact with the material being spot tested. Such spot tests are generally distributed in the chemical art. However, a fine compilation of spot tests can be found in "Spot Test in Organic Analysis," F. Feigl, Elsevier Pub., New York, 1966.

Illustrative of the test combinations which can be employed to carry out the present method are:

| Liquid Organic Compound | Impregnate Test Material | Indicator Color |
|---|---|---|
| acetaldehyde | *5% sodium nitroprusside; 20% morpholine | blue |
| acetone | *5% sodium nitroprusside; 30% sodium hydroxide | pink |
| methyl iodide | *solution of 2.7g ferric chloride in 100 ml of 2N HCl; 5% potassium ferricyanate; 5g of NaAsO$_2$ dissolved in 30 ml | blue |

-Continued

| Liquid Organic Compound | Impregnate Test Material | Indicator Color |
|---|---|---|
| acetaldehyde † | of 6N NaOH and mixed with 65 ml of 2N HCl *2N acetic acid; 3% hydrogen peroxide; 2% alcoholic solution of pnenylenediamine | green-black |

† used damp

Referring now to the drawings, FIG. 1 shows a typical sheet material 4 which was impregnated with a sensitizing medium and exposed to vapor (not shown) from a test surface which had reacted with the sensitizing medium to form patterns 1, 2, and 3 representing minute cracks or opening in the test surface.

Figure 2:
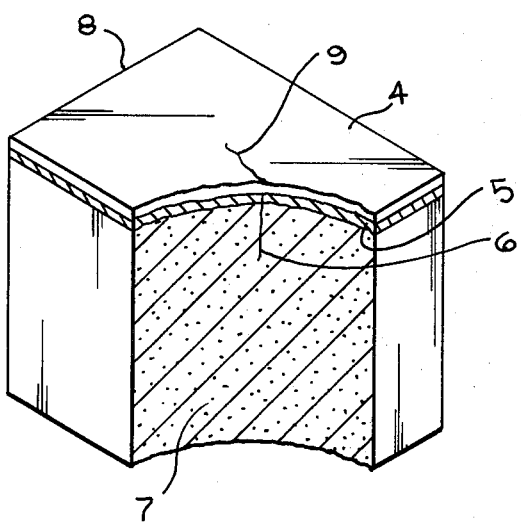
FIG. 2 is a non-proportional perspective and partial cross-sectional representation of a material being tested for surface defects.

In FIG. 2 a test sample 8 of a porous inner material 7 and supposedly continuous outer surface 5 is shown with indicator impregnated sheet material (filter paper) 4 adjacent to a surface for testing. The test surface had previously been contacted with an excess of a liquid organic material (not shown) which had penetrated into any surface detects, such as crack 6. The sample 8 with the impregnated sheet of filter paper was situated in an environment which caused the liquid organic material trapped in defect 6 and in subsurface material 7 to vaporize and pass through the filter paper 4. The indicator on filter paper 4 is reactive with the vaporized material, hence develops the pattern 9 on filter paper 4 pinpointing the defect. The vaporizing also removed all traces of the organic liquid that might have penetrated into the porous inner material 7 of sample 8.

It can be readily appreciated that the manner of applying the liquid organic material to the surface to be tested can vary to include brushing, spraying, immersing and the like, and that the material being tested need not have a porous inner portion. The method can also be employed to detect minute leaks and discontinuities in any type of material, for example, metal, galss, plastics, ceramics and the like.

In this regard, it should be especially noted that the present invention provides a permanent record of the test and of any discontinuities or defects which are detected. In particular, if the proper impregnant is used on the porous sheet of material reacting with the volatilizing fluid or liquid, a visible indicia or pattern will be permanently or semi-permanently imprinted or displayed on the sheet, and this sheet may then be filed or otherwise retained for record purposes.

EXAMPLE

Acetaldehyde was applied by brush to a sample of insulating material having a fibrous inner core and a water-impervious ceramic coating over its outer surfaces. After the sample was maintained under atmospheric pressure at room temperature for several minutes, the excess acetaldehyde was removed from the insulation sample, and the surface was allowed to dry under ambient or normal room conditions for about five to ten minutes.

A detection sheet was prepared by saturating a filter paper of about the size of the surface area to be tested with a freshly prepared aqueous solution of a 2.5 percent by wt. sodium nitroprusside and 10 percent by wt. of morpholine. The filter paper was towel dried and applied to the test surface of the insulation.

After 36 seconds of contact with the test surface, a pattern developed from the reaction of the acetaldehyde vapors and the solution on the detection sheet, representing the cracks and orifices and other defects in the test surface. The acetaldehyde totally evaporated from the sample on continued standing at room temperature and atmospheric pressure.

To the extent that reference to certain textual material has been made hereinabove, the material contained in those books is readily available in the art and within the knowledge of the art and is incorporated herein as indicative of the state of the art.

What is claimed is:

1. A method for detecting discontinuities in material comprising
   applying a liquid to a surface of the material,
   removing excess liquid from the surface,
   leaving a residual of said liquid in said discontinuities,
   placing adjacent to said surface a sheet material having impregnated therein a substance which when contacted with said liquid in vaporous form will produce a discernible indicia on said sheet material, and
   vaporizing said residual liquid.

2. The method according to claim 1 wherein said material comprise a non-porous surface and a porous inner portion and a residual of said liquid is left in said inner portion.

3. The method according to claim 2 wherein said liquid is an organic material.

4. The method according to claim 3 wherein said organic material is an organic compound.

5. The method according to claim 4 wherein said liquid has a vapor pressure of greater than 100 mm of Hg at a temperature in the range of 20° to 100° C.

6. The method according to claim 4 wherein said liquid has a vapor pressure of greater than 100 mm of mercury at a temperature in the range of 20° to 30° C.

7. The method according to claim 1 wherein said vaporizing is carried out under a pressure of less than 1 atmosphere.

8. The method according to claim 7 wherein the temperature of vaporization is up to about 100° C.

9. The method according to claim 4 wherein said sheet material is paper which is penetratable by said vaporized organic compound.

10. The method according to claim 9 wherein said paper is impregnated with a chemical composition reactive with said vaporized organic compound to form a visible pattern on said paper sheet corresponding to said surface discontinuity.

11. The method according to claim 10 wherein said liquid is acetaldehyde.

12. The method according to claim 11 wherein said paper sheet is impregnated with a solution of 2.5 percent sodium nitroprusside and 10 percent morpholine.

13. A method of detecting discontinuities or the like in the surface of a relatively porous body having a coating of relatively impervious material, comprising
   disposing a vaporizable fluid penetrant over the surface of said coated body to cause at least a portion thereof to enter said body through any discontinuity in said coating thereon, removing any accumulating penetrant from said surface, and disposing on said body a sheet of detection material impregnated with a reagent capable of interacting with vapor emanating from penetrant sorbed in said body under said coating and escaping through any discontinuity therein.

14. The method described in claim 13, wherein said penetrant is an organic substance with a vapor pressure greater than 100 mm of mercury at a temperature greater than 20° C. and not greater than 30° C.

15. The method described in claim 14, wherein said penetrant is acetaldehyde.

16. The method described in claim 15, wherein said reagent is a solution composed generally of 2.5 percent sodium nitroprusside and 10 percent morpholine.

* * * * *